Feb. 6, 1934.  G. A. LYON  1,946,326
TIRE COVER
Filed June 8, 1931    2 Sheets-Sheet 1

Inventor
George Albert Lyon.
by Charles M. Hill  Attys.

Feb. 6, 1934.     G. A. LYON     1,946,326
TIRE COVER
Filed June 8, 1931     2 Sheets-Sheet 2
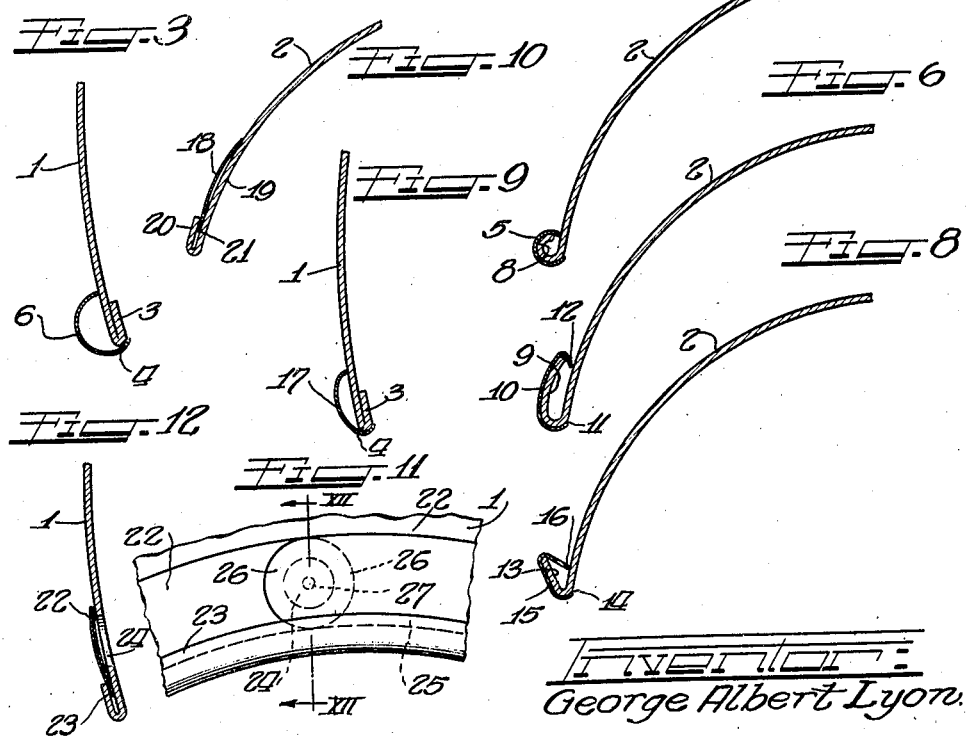

Patented Feb. 6, 1934

1,946,326

UNITED STATES PATENT OFFICE 1,946,326

TIRE COVER

George Albert Lyon, Allenhurst, N. J., assignor to Lyon Incorporated, Asbury Park, N. J., a corporation of Delaware Application June 8, 1931. Serial No. 542,787

3 Claims. (Cl. 150—54)

This invention has to do with tire covers, particularly of that character embodying a side plate for covering a side wall of a tire and an outer ring or rim for overlying the tread of a tire.

It is one of the principal objects of this invention to provide the unconcealed edges of the tire cover parts with metal trim or molding which is preferably chrome plated or of stainless steel or the like to enhance the attractiveness of the tire cover and at the same time providing a means by which the cover may be handled conveniently and without danger of mutilating the hands or clothing, without in the least interfering with the fit of the tire cover in a fender well.

Another object of the invention resides in the provision of special methods by which molding, metal trim and the like may be permanently secured adjacent the edges of tire covers.

Further objects and advantages of the invention will appear as the description proceeds.

Figure 2 is an enlarged fragmentary sectional view taken approximately in the plane indicated by the line II—II in Figure 1.

Figure 3 is an enlarged fragmentary sectional view showing the relation between the strip of molding or metal trim and the inner edge of the side plate of the tire cover.

Figure 4 is an enlarged fragmentary sectional view showing how a strip of metal molding is secured to an edge of the outer ring or rim of the tire cover.

Figure 6 is an enlarged fragmentary sectional view of one side of Figure 5.

Figure 8 is an enlarged fragmentary sectional view of one side of Figure 7.

Figure 9 is an enlarged fragmentary sectional view of a still further modified form of molding for attachment to the inner peripheral edge of the side plate.

Figure 10 is an enlarged fragmentary sectional view showing a still further form of molding attached to an edge of the outer ring.

Figure 11 is a fragmentary view showing a portion of a side plate adjacent its inner peripheral edge and how a strip of molding is secured thereto.

Figure 12 is a fragmentary sectional view taken approximately in the plane indicated by the line XII—XII in Figure 11.

Figure 1:
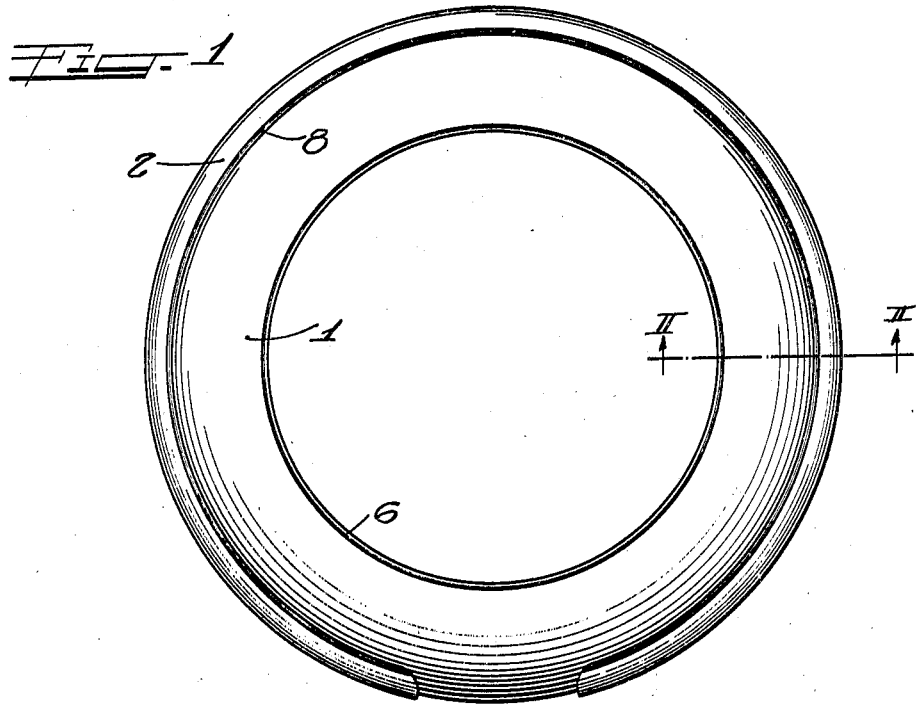
Figure 1 shows a tire cover made in accordance with the present invention assembled on a tire.

Referring now more particularly to the drawings, wherein the same parts are indicated throughout by the same reference characters, the tire cover constructed in accordance with the present invention embodies a side plate 1 and an outer ring or rim 2, the latter being split and preferably resilient whereby to hold itself and the side plate 1 firmly on a tire.

Tire covers of this character are very attractive and improve immensely the appearance of any motor car in connection with which they are used. However, unless the exposed edges of the parts of the tire cover are smoothed in one way or another, it is sometimes somewhat difficult to properly grasp the tire cover parts for the purpose of securing the same to or removing them from a tire and for other handling. Moreover, the appearance of the tire cover is materially enhanced when it carries metal trim or molding at its exposed edges.

In accordance with the present invention, therefore, I apply molding which may take any of various forms, to the exposed edges of the side plate 1 and outer ring 2. In accordance with the form of the invention shown in Figures 1, 2, 3 and 4, the inner marginal edge 3 of the side plate 1 is bent inwardly upon itself to provide a rounded edge 4 as shown in Figures 2, 3 and 9, and the marginal portions 5 of the outer ring 2 are curled outward upon the ring 2 in the form of a substantially cylindrical bead. A circular strip 6 of molding or metal strip trim substantially C-shaped in cross section is applied to the inner margin of the side plate 1, its inner edge portion 7 being spun or rolled against the edge 4 until both edges of the strip 6 tightly engage opposite portions of the inner margin of the side plate. Inasmuch as the outer ring 2 is not a continuous circle, the strip 8 of molding or metal trim is also not continuous, but is nevertheless applied and secured to each marginal portion 5 of the outer ring 2 in much the same manner in which the strip 6 is applied to the inner margin of the side plate 1. Because of the rounded contour of each strip, it will be evident that the strips facilitate the grasping of the side plate and outer ring by the hands and obviate the likelihood of scratching and breaking the fingernails by the elimination of sharp or rough edges.

Moreover, a tire cover formed with molding in accordance with the present invention will fit easily into a fender well since fender wells are made of substantially greater width than the tires which they are adapted to receive. Since the side plate 1 is almost universally finished in black enamel or the like or in a color substantially matching or harmonizing with that of the car in connection with which it is used, it will be evident that metal molding or trim such as designated at 6 and 8, finished in chrome plate or made of stainless steel or the like, will present a pleasing contrast to the color of the side plate and will greatly enhance the beauty of the cover as a whole.

Figure 5:
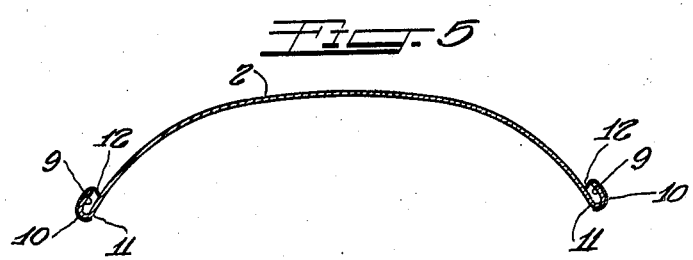
Figure 5 is a cross sectional view of the other ring of a tire cover having a modified form of molding applied to its edges.

Figures 5 and 6 show a somewhat modified marginal construction for the outer ring 2, in that the margins 9 are substantially parallel to and spaced from the body of the outer ring 2, and a strip of molding 10 similar to that shown at 6 but somewhat flatter is spun or rolled into firm engagement with the rounded edge 11 and the marginal portion 9. It will be noted that the upper margin 12 of the molding 10 projects into the space between the margin 9 and the body of the outer ring 2 to provide a more secure attachment of the molding in position.

Figure 7:
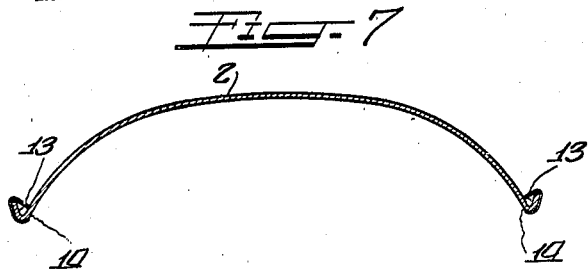
Figure 7 shows a further modified form of molding connected to the edges of the outer ring or rim of a tire cover.

In Figures 7 and 8 is shown a still further modified molding construction to be used in connection with the outer ring. In this form of the invention, each margin 13 is return bent as in the previously described forms to provide rounded edges 14, except that the margins 13 extend outwardly at an angle to the adjacent portion of the outer ring 2. The strip of molding 15 snugly follows the contour of the margin 13 and is provided with an inwardly projecting marginal portion 16 corresponding to the marginal portion 12 of the previously described form.

Figure 9 depicts a construction very similar to that shown in Figure 3, except that the molding 17 is somewhat shallower.

The various marginal portions of the outer ring and side plate hereinbefore described serve as a base or reinforcing means for the forms of molding designated 8, 10, and 15. The operation by which the marginal portions of the parts of the tire cover are return bent may cause the bent portion of the metal to be marred, and the resultant unsightliness is entirely concealed by the molding.

Still another type of molding may be employed for the purpose of ornamentation of the tire cover parts. To this end, a thin strip 18 is formed on an arc in cross section of preferably greater curvature than the corresponding marginal portion 19 of the outer ring 2, and the extreme margin 20 of the ring is return bent in somewhat spaced relation to the portion 19 as shown in Figure 10. The strip 18 is rolled or otherwise formed in a shape corresponding with the portion 20 of the outer ring 2 and substantially co-extensive in length therewith, and the inner margin 21 of the strip 18 is inserted into this space. The margin 20 is thereafter clinched toward the portion 19 so that the margin 21 of the strip 18 is tightly held in position.

A companion strip of molding 22 to match or complement the strip 18 is applied to the side plate 1. One method by which the strip 22 may be secured to the side plate 1 invloves the shaping of the strip into substantially circular form corresponding with the extreme return bent margin 23 of the side plate. The side plate is provided with an opening 24 adjacent the margin 23, and the strip 22 is positioned with its marginal portion 25 disposed in the space between the body of the side plate 1 and the margin 23 thereof, with the ends 26 of the strip 22 in overlapped relation and covering the opening 24. The opening 24 is provided to permit contact of the overlapping ends 26 with the poles of a spot welding apparatus so that the ends of the strip 22 may be united at 27. While this may be considered as the complete operation by which the strip 22 is secured in position, it may be advisable to prevent slippage of the strip 22, and to this end the margin 23 may be spun or otherwise clinched toward the body of the side plate 1 to firmly grip the marginal portion 25 of the strip 22 in position against movement.

The metal of the strips 18 and 22 is preferably extremely thin, and by imparting a greater curvature in cross section to these strips than is imparted to the adjacent portions of the outer ring and side plate respectively, with the concave surfaces of the strip facing the convex surfaces of the tire cover parts, the strips practically merge with the adjacent surfaces of the tire cover parts, and thereby enhance the aesthetic effect of the cover as a whole.

Another method of securing the strip 22 in place involves the formation of the strip as an integral circle with its inner diameter somewhat greater than that of the side plate, placing it on the inner margin of the side plate in substantially concentric relation thereto, and bending said margin, upon itself to thereby straddle the inner margin of the strip.

This process could also be carried out in securing the strip 18 in position.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A tire cover having an exposed edge return bent in spaced relation to the body of the cover, a strip of metal of greater cross-sectional curvature than the cover and having a marginal edge thereof disposed in the space between the cover and the first marginal edge and clinched therein.

2. The method of securing a strip of molding to a circular edge of a tire cover member, which comprises the steps of bending said edge upon itself to provide a circular groove, forming said strip into a circle with its ends overlapped, positioning said strip with its inner edge disposed in said groove, forming a hole in said member adjacent said groove and positioning said overlapped ends in substantial alignment with said hole, applying the poles of a spot welding apparatus to the exposed sides of said overlapped ends, and spot welding the same.

3. The method of securing a strip of molding to a continuous margin of a tire cover member, which comprises the steps of turning said margin upon itself to form a circumferential groove, forming said strip into an annulus of a length in excess of the length of said groove, forming a hole in said member adjacent said groove, positioning said annulus with its inner edge fitting in said groove and its ends overlapped, with said ends aligned with said hole, and spot welding said ends, said hole permitting the engagement by the spot welding apparatus of an otherwise unexposed surface of said overlapped ends.

GEORGE ALBERT LYON.